March 9, 1965 — J. L. AASLAND — 3,172,318
RETAINING MEANS FOR ROLLER CHAIN
Filed July 24, 1962
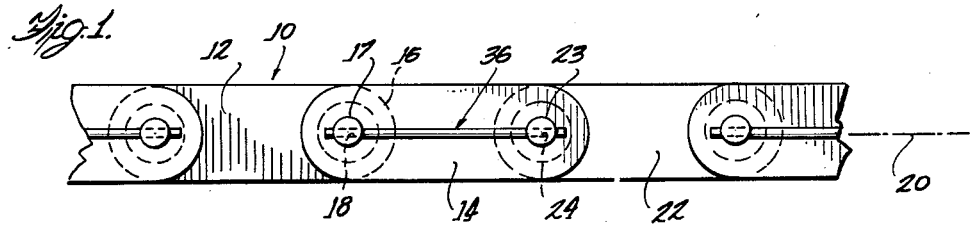
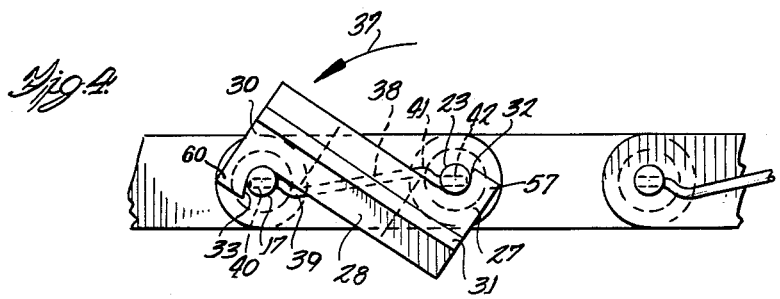
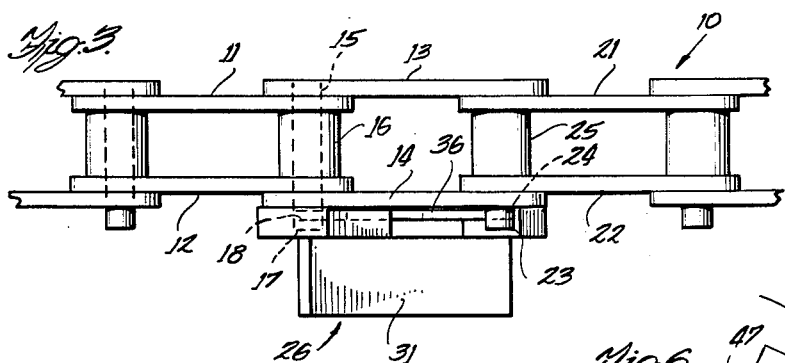
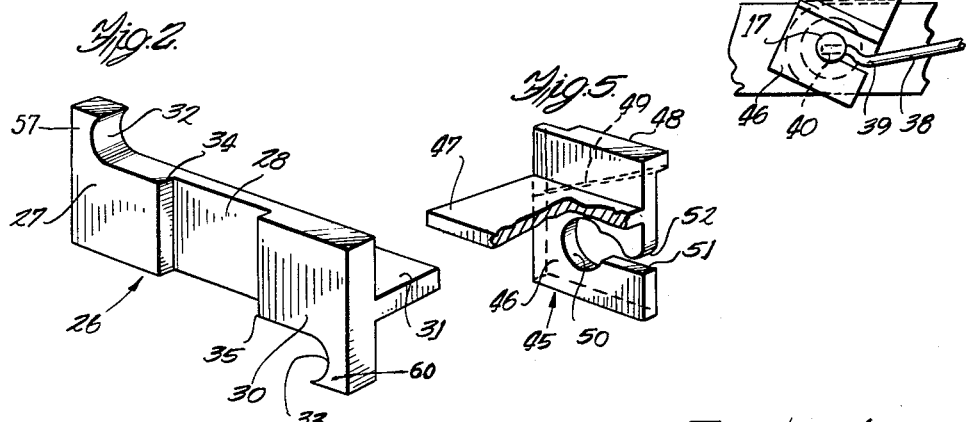
Inventor
John L. Aasland
Paul O. Pippel
Attorney

United States Patent Office 3,172,318
Patented Mar. 9, 1965

3,172,318
RETAINING MEANS FOR ROLLER CHAIN
John L. Aasland, Pasadena, Calif., assignor to International Harvester Company, Chicago, Ill., a corporation of New Jersey
Filed July 24, 1962, Ser. No. 212,058
1 Claim. (Cl. 72—457)

This invention is directed to a retaining or restraining means for a roller chain, and more particularly to a means which positively prevents the rotation and/or removal of the pins which afford connection between adjacent sets of links.

Roller chains have been used in a variety of applications, including many environments in which a high-speed drive arrangement is required. When a large load is continually applied to the roller chain and high speeds are encountered, it is possible for the pins which interconnect the links to wear, and, after rotating in place, thereafter the pins become sufficiently worn so that they work loose and the link opens. To obviate this difficulty various attempts have been made to insert a locking member through protruding ends of adjacent pairs of pins, but such efforts generally have not met with success either because of the complexity and difficulty of forming and inserting the locking members, or the use of members which are overly large and extend too far beyond the pins.

It is therefore a primary object of the present invention to provide a restraining means for a roller chain which is simple, positive in operation, and easy to install.

It is a further object of the present invention to provide such a lock for a roller chain which avoids one or more of the difficulties encountered with prior art devices in this field.

A more specific object of the invention is to provide an uncomplicated and easily handled tool for rapidly and positively deforming a straight member into an effective locking means for use in accordance with the inventive principles.

A related object of the invention is the provision of an unobvious locking means, which, in the absence of the special lock-forming tool, can be readily produced by a conventional tool such as a pliers.

When used on harvesting or grass-handling farm equipment, conventional cotters and spring clips tend to catch grasses and similar materials, bending the locking means out of shape and causing the locking means to wear excessively and even break.

It is, therefore, a particular object of the present invention to provide a locking means which obviates the enumerated deficiencies of conventional cotters and spring clips.

The foregoing and other objects of the invention are realized, in one embodiment, by providing a locking means which initially is comprised of only a straight pin extending through the axially protruding portions of the two pins connecting a set of links. The straight locking means is initially aligned substantially coincident with the longitudinal axis of the chain assembly. In accordance with the inventive teaching, the novel tool of the invention or a conventional apparatus may be utilized to provide a positive bend in the cutter unit adjacent each of the protruding shafts, but each of the bends is in an opposite direction with respect to the other bend. The forces thus produced by the two oppositely directly bends provide for positive retention of the cotter or locking unit within the ends of the protruding shafts, maintaining alignment of the shafts and preventing their removal from the link assemblies.

The best mode contemplated for carrying out the invention will now be described. To enable those skilled in the art to make and use the invention, such description is set forth in connection with the accompanying drawing, in the several figures of which like reference numerals identify like elements, and in which:

FIGURE 1 is a side view of a portion of a chain assembly, including straight cotter units after insertion but before their deformation to provide the unobvious locking means of the invention;

FIGURE 2 is a perspective illustration of a novel tool useful in effecting the deformation of the cotter unit;

FIGURE 3 is a top view, depicting the tool of FIGURE 2 positioned adjacent the undeformed cotter unit to effect the re-alignment thereof into the locking means of the invention;

FIGURE 4 is a side view illustrating the movement of the tool as the requisite re-alignment of the cotter unit is effected; and FIGURES 5 and 6 are perspective and partial side views, respectively, illustrating another embodiment of a tool for effecting the ends of the invention.

The structure of a conventional chain assembly 10 is particularly illustrated in FIGURES 1 and 3 of the drawings. As shown in FIGURE 3, a first pair of side bars or links 11 and 12 is connected to an adjacent pair of links 13 and 14 by a pintle pin or shaft 15, shown extending through a bore of link 13, through link 11, through the center portion of a hollow cylindrical spacer unit 16, through link 12, link 14, and outwardly in an axial extension 17 which protrudes beyond the outer portion of link 14. Portion 17 defines a bore 18 extending substantially parallel with a reference axis 20 (FIGURE 1) which is coincident with the axis of the chain assembly as shown in the drawings.

In like manner an adjacent pair of links 21 and 22 is intercoupled with links 13 and 14 by a shaft 23 which extends through the last-mentioned pairs of links. Shaft 23 also extends beyond link 14 as illustrated, and defines a bore or cylindrical opening 24 therethrough. Another hollow cylindrical spacer 25, interposed between links 21 and 22, maintains the proper spacing in this portion of the chain assembly.

FIGURE 2 depicts one type of lock-providing tool particularly useful with the invention. As there shown, tool 26 comprises a generally rectangular body including a first portion 27 of given thickness, an intermediate portion 28 of a thickness less than that of portion 27, and another end portion 30 of substantially the same thickness and other dimensions as portion 27. Each of said portions 27 and 30 have lateral projections 57 and 60 respectively that extend in opposite directions. The centrally facing surfaces of lateral projections 57 and 60 are shaped to define an arcuate or concave aligning surfaces 32 and 33 respectively. A handle portion 31, which may be formed integrally with tool 26 or subsequently affixed by welding or otherwise to the body portion, extends substantially perpendicular to the body of tool 26 and approximately along the entire length thereof. The reduction in body thickness between center section 28 and each of the two end portions 27 and 30 provides a first working surface or lip 34 and a second lip 35, which lips are utilized in the actual deformation or re-alignment of a straight cotter unit into the locking means of the invention.

To form the unobvious locking means of the invention, a straight or undistorted cotter unit 36 is inserted through the bore sections 18 and 24 of the extremities of shafts 15 and 23, respectively, as shown in FIGURE 1. Inasmuch as the restraining means is initially a straight length of wire, a continuous feed of wire can be utilized and clipped off by a diagonal cutter (not shown) or other conventional cutting tool to provide a single cotter extension 36 as illustrated. Accordingly, the basic economy and easy insertion in this initial step is manifest.

Further in accordance with the inventive teaching, and as particularly illustrated in FIGURES 2 and 3, tool 26 is positioned adjacent and substantially parallel to link 14, so that arcuate portion 32 of the tool abuts the extension of shaft 23, and the other arcuate portion 33 is abutting the extension 17 of shaft 15. In this position the respective lips or working surfaces 34 and 35 engage portions of cotter unit 36 adjacent the extremities of shafts 15 and 23. Accordingly, in this position the handle 31 of tool 26 is rotated through only a slight angular displacement in the direction indicated by arrow 37 in FIGURE 4, to deform the cotter unit into the locking assembly depicted in FIGURE 4. After such displacement of the tool 26, locking unit 36 comprises a central portion 38 which is only slightly offset from and therefore substantially parallel to axis 20 of the chain assembly, a first bend or arcuate portion 39 and an extremity 40 adjacent this bend, which extremity does not extend beyond the bore 18 of shaft extension 17. At the other end of central portion 38 is a bend 41, which bend extends in a direction opposite to the direction of bend 39; another cotter extremity 42 is now provided wholly within bore 24 of shaft 23. Thus after the movement of tool 26, the positive but oppositely-directed bends 39 and 41 impart to the cotter unit 36 a bias force which maintains the extremities 40 and 42 positively within the extremities of shafts 15 and 23 as indicated. Moreover, the lateral dimension of unit 36 has been shortened by providing the deformation or arcuate portions 39 and 41 therein, thereby to withdraw the extremities of the cotter unit entirely within the bores in the extremities of the two connecting shafts. Thus with no protrusion of the cotter or locking pin there is no area available to be struck or damaged by tools or other objects coming into a position adjacent to the drive chain; this is an important feature for safety and long use of the novel restraining means.

Another embodiment of a tool constructed in accordance with the inventive teaching is depicted in FIGURE 5. As there shown, tool 45 includes a main body portion 46, and a handle portion 47 affixed to the rear of portion 46 and disposed substantially perpendicular thereto. A stop portion 48 affixed to the upper rear part of main body portion 46 terminates in an inclined back wall 49, which back wall may abut the upper portion of a link during the formation of the bends in a cotter unit. Body portion 46 also defines a central substantially circular or arcuate portion 50, and a channel leading from portion 50 which channel is defined between a straight wall 51 and a curved lip or working portion 52 of the tool.

In practice, tool 45 is positioned adjacent a link, as indicated in FIGURE 6, and handle portion 47 is grasped and rotated to rotate the tool in the clockwise direction as indicated by arrow 53. Accordingly, lip 52 engages a portion of the cotter unit to provide a bend 39 intermediate the central portion 38 and extremity 40 of the cotter unit. Tool 45 is then removed, reversed so that lip 52 faces upwardly and flat portion 51 faces downwardly, and utilized to provide a similar but oppositely-directed bend adjacent the other terminal portion of the cotter unit as explained above.

It is evident that the invention provides a simple and economical means for rapidly and positively forming a locking means for a roller chain, which means prevents both the axial rotation of the shafts which interconnect the links or the dropping out of the shafts from the assembly. The tools illustrated and described are simply fabricated, or in the absence of such tools a common hand tool such as pliers can be utilized to provide the two oppositely-directed bends adjacent the opposite ends of the cotter unit.

What is claimed is:

A cotter lock-forming tool for use with a roller chain of the type having a plurality of links with shafts extending transversely of said links to provide inter-coupling therebetween, and cotter means extending substantially parallel with the axis of said chain assembly and through bores defined in the extremities of said shafts, said lock-forming tool having a generally rectangular shape including a central portion and first and second end portions inter-coupled by said central portion, said central portion having a thickness dimension different from the thickness dimension of said end portions to define first and second lip portions, each of said end portions having a lateral projection, said lateral projection extending from said end portions in opposite directions, the centrally facing surface of said lateral projections being concave such that they are adapted to pivotally engage the extremities of the shafts, an operating means affixed to said tool for effecting angular displacement thereof, whereby said lips are forced against the cotter means to provide a pair of spaced apart and oppositely directed bends therein which function to maintain the requisite alignment and retention of the shafts in the roller chain assembly.

References Cited by the Examiner
UNITED STATES PATENTS

| | | | |
|---|---|---|---|
| 269,498 | 12/82 | Gurney | 140—118 |
| 368,438 | 8/87 | Wintrode | 140—118 |
| 775,143 | 11/04 | Lerol | 140—117 |
| 1,460,749 | 7/23 | Dull | 59—8 |
| 1,658,358 | 2/28 | Snapp | 81—15 X |
| 1,812,496 | 6/31 | Rabezzana | 81—15 |
| 2,130,063 | 9/38 | Bryant | 74—251 |
| 2,155,626 | 4/39 | Weiss | 59—8 |
| 2,466,639 | 4/49 | Fock et al. | 74—251 |
| 2,548,414 | 4/51 | Wilson | 81—15 |
| 2,878,699 | 3/59 | Stricklett | 81—15 |
| 2,900,714 | 8/59 | Watkins | 81—15 X |
| 2,938,413 | 5/60 | Pauls | 81—15 |

WILLIAM FELDMAN, *Primary Examiner.*

MILTON KAUFMAN, *Examiner.*